United States Patent
Cucchiara (12) 
(10) Patent No.: US 6,546,424 B1
(45) Date of Patent: Apr. 8, 2003

(54) APPARATUS AND METHOD FOR ANALYZING THE EFFECT OF ADDING A USER GROUP TO A COMPUTER NETWORK

(75) Inventor: Joan Cucchiara, Concord, MA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/204,769

(22) Filed: Dec. 3, 1998

(51) Int. Cl.[7] .................. G06F 15/173; G06F 17/50; G09G 5/00
(52) U.S. Cl. ................. 709/226; 709/224; 703/13; 345/736
(58) Field of Search .................. 709/223–226; 703/13, 21–22; 370/252–253; 714/47; 345/734–736

(56) References Cited

U.S. PATENT DOCUMENTS

| | | | | |
|---|---|---|---|---|
| 5,175,800 A | * | 12/1992 | Calis et al. ................. | 703/21 |
| 5,440,719 A | * | 8/1995 | Hanes et al. ................ | 706/45 |
| 5,706,436 A | * | 1/1998 | Lewis et al. ................ | 709/235 |
| 5,712,981 A | * | 1/1998 | McKee et al. ............... | 709/223 |
| 5,809,282 A | * | 9/1998 | Cooper et al. ............... | 709/226 |
| 5,982,748 A | * | 11/1999 | Yin et al. .................... | 370/232 |
| 6,014,697 A | * | 1/2000 | Lewis et al. ................ | 709/223 |
| 6,086,618 A | * | 7/2000 | Al-Hilali et al. ............. | 703/2 |
| 6,141,680 A | * | 10/2000 | Cuchiara .................... | 709/201 |
| 6,209,033 B1 | * | 3/2001 | Datta et al. .................. | 709/224 |
| 6,298,044 B1 | * | 10/2001 | Britt ........................... | 370/252 |
| 6,308,174 B1 | * | 10/2001 | Hayball et al. .............. | 707/10 |
| 6,430,614 B1 | * | 8/2002 | Cucchiara ................... | 709/223 |

* cited by examiner

*Primary Examiner*—Andrew Caldwell (57) ABSTRACT

An apparatus for analyzing the effect on a network characteristic (e.g., throughput or latency) of adding a user group to a network (having a maximum network characteristic) produces a reconfiguration message if addition of the user group adversely affects the network characteristic across the network. To that end, the apparatus first monitors data flow in the network over a selected time interval to produce network characteristic flow data. Once the network characteristic flow data is produced, group minimum network characteristic data (i.e., representing the minimum network characteristic requirement of the user group) is combined with the monitored network characteristic flow data to produce combined network characteristic data. The reconfiguration message then is produced if the combined network characteristic data is not compatible with the maximum network characteristic of the network. The reconfiguration message provides information relating to reconfiguring the network to facilitate the addition of the user group to the network.

42 Claims, 5 Drawing Sheets

APPARATUS AND METHOD FOR ANALYZING THE EFFECT OF ADDING A USER GROUP TO A COMPUTER NETWORK

FIELD OF THE INVENTION

The invention generally relates to computer networks and, more particularly, the invention relates to analyzing the effect of adding a new user group to a computer network.

BACKGROUND OF THE INVENTION

A local area network ("LAN") is a network of interconnected computer devices (e.g., computers, workstations, servers, printers, etc. . . .) that cooperate to share common network resources. For example, a LAN may be configured so that each computer on the LAN utilizes a single printer. LANs often include a networking device (e.g., a router) that connect such LANs with computers on other networks (e.g., the Internet). Computer users on a LAN commonly transmit documents and other information to other computer users via known document delivery methods, such as electronic mail. Those other computer users may be on the same LAN as the transmitting user, or on another LAN that is coupled to such user's LAN via a network device.

Users of a LAN commonly are identified by identification data (e.g., a user name and password) that must be provided to the LAN prior to enabling user access to the LAN. After being verified as a user of the LAN, a user can freely access selected LAN resources. The LAN may be configured, however, to provide certain resources to selected users. For example, the LAN may be configured so that nobody but a LAN system administrator can access a LAN configuration database.

A LAN also can be configured to group LAN users into "user groups" that each have common network characteristics (e.g., similar traffic characteristics). One such network characteristic is a minimum data throughput requirement. For example, a LAN may include a high priority user group having a minimum data throughput requirement that ensures that data traffic transmitted from users of such user group is transmitted no slower than a relatively high rate (e.g., 10,000 megabits per second). The throughput of users in other, lower priority user groups thus may be reduced to ensure the minimum throughput required by the high priority user groups. Other well known types of user groups include an "IP flow" user group, and a virtual private network.

Minimum throughput rates can be dictated by various levels of quality of service ("QoS") assigned to each user group. As is known in the art, each level of QoS specifies a guaranteed throughput for a LAN user within a LAN. The previously noted exemplary high priority user group thus may be operating at a high QoS level such as, for example, the well known "premium service" level. Other, lower priority user groups may be configured to operate at lower QoS levels, such as the well known "best effort" or "assured service" levels.

Due to LAN equipment limitations, the QoS level assigned to each user group in a LAN often affects the throughput (i.e., QoS) of data transmitted by other user groups in such LAN. More particularly, since each LAN user utilizes the same transmission equipment within a given LAN, data transmission by each LAN user affects data transmission by other LAN users. Too much data traffic on a LAN thus can reduce throughput of certain users on a LAN to rates that are below the minimum requirements specified by their respective user groups. The minimum throughput levels therefore must be assigned to the user groups based upon the limitations of the equipment on the LAN. For example, a LAN with a limited throughput capacity cannot support many high priority user groups that have high minimum throughput requirements. The minimum throughput requirements of each user group on a LAN thus must be balanced to support various minimum throughput requirements.

Problems thus often arise when a new user group is added to an existing LAN. Specifically, the minimum throughput requirement of a new user group undesirably can reduce the actual throughput of data transmitted from the existing user groups to rates that are below their required minimums. To avoid this, network administrators manually add the new user group to the LAN to determine if minimum throughput requirements of existing user groups are affected in such a manner. This process commonly is repeated in an iterative manner by manipulating various network parameters (i.e., minimum throughput requirements of existing or new user groups) until the LAN is balanced to support the new user group. Although it can produce a balanced LAN, such an iterative process is time consuming, inefficient, and consequently, expensive. Moreover, such iterative process is error prone, and can be disruptive to other users.

SUMMARY OF THE INVENTION

In accordance with one aspect of the invention, an apparatus for analyzing the effect on a network characteristic of adding a user group to a network (having a maximum of the network characteristic, such as throughput or latency) produces a reconfiguration message if addition of the user group adversely affects such network characteristic across the network. To that end, the apparatus first monitors data flow in the network over a selected time interval to produce network characteristic flow data. Once the network characteristic flow data is produced, group minimum network characteristic data (i.e., representing the minimum network characteristic requirement of the user group) is combined with the monitored network characteristic flow data to produce combined network characteristic data. The reconfiguration message then is produced if the combined network characteristic data is not compatible with the maximum network characteristic of the network. The reconfiguration message provides information relating to reconfiguring the network to facilitate the addition of the user group to the network.

In preferred embodiments, the user group includes at least one node, such as a computer, and the network is a local area network. In other embodiments, an approval message is produced if the combined network characteristic data is compatible with the maximum network characteristic of the network. The approval message indicates that the user group may be added to the network and still maintain the user group minimum network characteristic requirement. The combined network characteristic data may be deemed to be compatible with the maximum network characteristic of the network if the value of the combined network characteristic data does not exceed the value of the maximum network characteristic at any time during the selected time interval.

In other embodiments, the network includes at least one existing user group having an existing group network characteristic minimum. An approval message (noted above) indicates that the user group may be added to the network without affecting the existing user group minimum of any of the existing user groups. In this and similar embodiments, the reconfiguration message may include information indicating that the network characteristic flow data of the network must be reduced to enable the user group to be added and still maintain the required minimum network characteristic across the network. Such reconfiguration message may include information indicating that the existing group minimum network characteristic requirements of one of the existing groups must be reduced to enable the user group to be added while still maintaining the required user group minimum network characteristic across the network. After receipt of the reconfiguration message, the network may be reconfigured in accord with its recommendations.

In some embodiments, it is determined if the combined network characteristic data is compatible with the maximum network characteristic of the network prior to producing either the reconfiguration message, or the approval message. In other embodiments, the reconfiguration message indicates that the group minimum network characteristic data of the user group may be maintained if the user group is operated on the network at no times other than during one or more specified time intervals.

A user interface may be displayed on a graphics device that enables a user to enter configuration data for the user group into a computer system. The configuration data may include data specifying a quality of service level. The quality of service level may have a minimum network characteristic requirement that dictates the minimum network characteristic requirement of the user group.

In accordance with another aspect of the invention, an apparatus for adding a user group to a network comprises a data monitor that monitors data flow in the network for a selected time interval, a simulator that simulates the effect of adding the user group to the network during the selected time interval, and a recommendation module the processes the data produced by the simulator to produce recommendation data. The simulator produces simulation data based upon the monitored data flow in the network as produced by the data monitor, and a minimum network characteristic requirement of the user group. The recommendation data recommends a network configuration that enables the addition of the user group to the network.

The minimum network characteristic of the user group may be defined by group minimum network characteristic data. In preferred embodiments, the simulator includes a combiner that combines the group minimum network characteristic data with the network characteristic flow data monitored over the selected time interval to produce the simulation data. The apparatus also may include a user group adder that reconfigures the network to enable the addition of the user group. The recommendation data may recommend a network configuration that enables the user group to be added in a manner that maintains the minimum network characteristic requirement of the user group.

Preferred embodiments of the invention are implemented as a computer program product having a computer usable medium with computer readable program code thereon. The computer readable code may be read and utilized by the computer system in accordance with conventional processes.

BRIEF DESCRIPTION OF THE DRAWINGS

The foregoing and other objects and advantages of the invention will be appreciated more fully from the following further description thereof with reference to the accompanying drawings wherein.

DESCRIPTION OF PREFERRED EMBODIMENTS

In preferred embodiments of the invention, an apparatus, method, and computer program product for analyzing the effect of adding a new user group (discussed below) to a network produces a reconfiguration message if addition of the new user group adversely affects throughput of data (i.e., bandwidth) through the network. The reconfiguration message includes information that a network system administrator can utilize in reconfiguring the network to add the new user group. Details of the apparatus, method, and computer program product are discussed in detail below.

Figure 1:
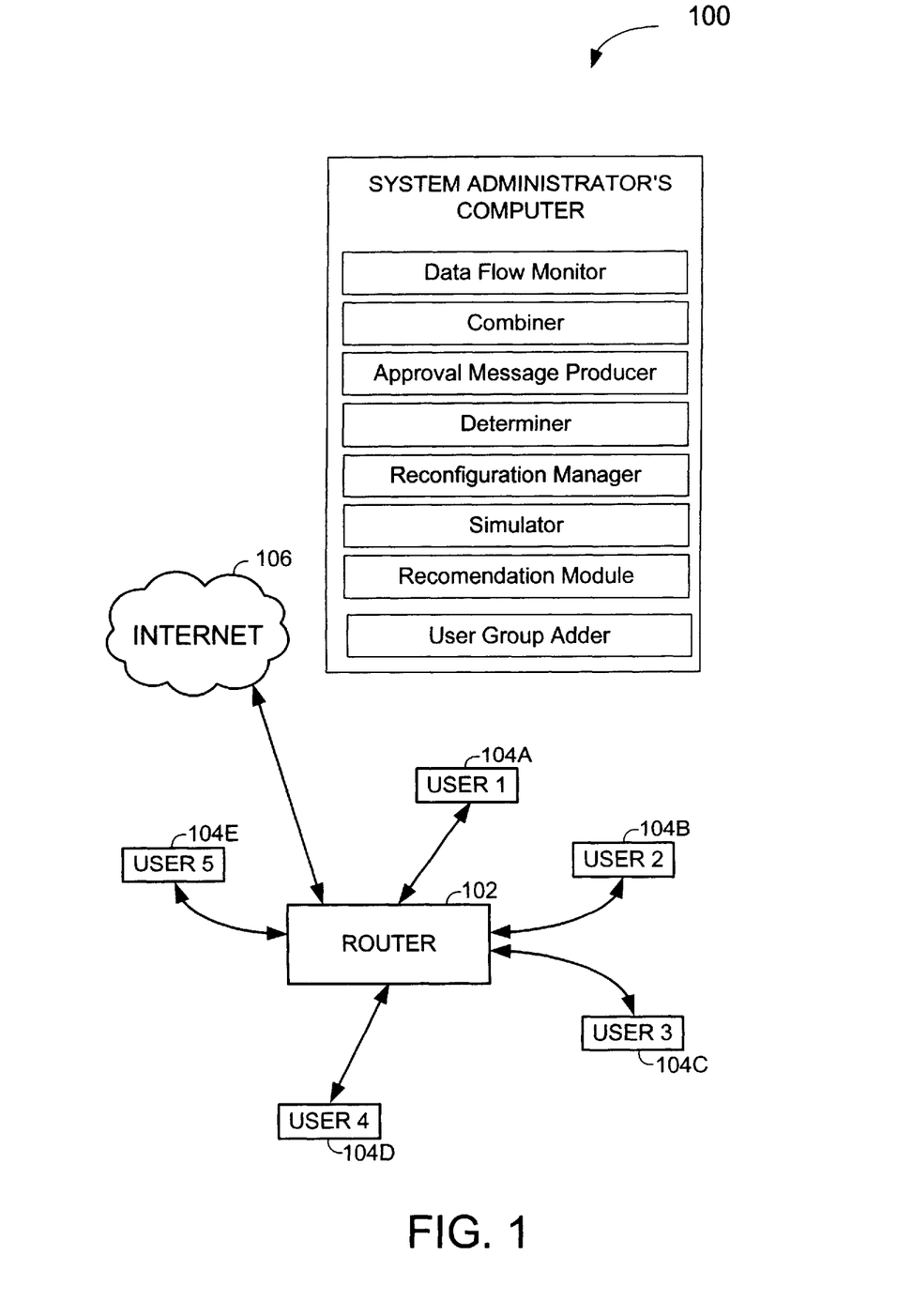
FIG. 1 schematically shows a network that may be utilized to implement preferred embodiments of the invention.

FIG. 1 schematically shows a network 100 that may be utilized to implement preferred embodiments of the invention. The network 100 preferably is a local area network (identified as LAN 100) having a router 102 and five user nodes 104A–104E. Although five user nodes are shown, the LAN 100 can include any reasonable number of nodes. For example, the LAN 100 may include as few as one node, or many more than five nodes. Each node 104A–104E may be a computer device, such as a personal computer, server, workstation, or other computer device. In addition, other types of computer devices, such as printers, scanners, and mass storage devices (e.g., disk arrays) also may be coupled to the LAN 100. The LAN 100 may operate in accord with any known LAN protocol, such as the Ethernet LAN protocol.

The router 102 may be any router known in the art, such as a BN™ model router, available from Bay Networks Inc. of Santa Clara, Calif. The router 102 preferably has an interface for coupling with another network, such as the Internet 106. Although shown with a router 102, other network devices may be utilized to couple the LAN 100 with other networks. Moreover, any known LAN configuration may be utilized in accord with preferred embodiments of the invention. In alternative embodiments, the LAN 100 does not include the router 102 or similar network device and thus, is not connectible to the other networks.

In accord with preferred embodiments of the invention, each node 104A–104E is assigned to one of several user groups that each have specified network characteristics. For example, nodes one, two, and three (104A–104C) may be assigned to a first user group, while nodes four and five (104D and 104E) may be assigned to a second user group. Each user group may have no member nodes ("members"), or many members. Among other network characteristics, each user group is assigned a specified quality of service ("QoS") level, and a specified data transmission security protocol (e.g., the Rivest, Shamir, and Adleman cryptography method). Accordingly, each user group has a minimum data throughput requirement for data transmitted within the LAN 100. This minimum requirement preferably is that which is required by the QoS level assigned to each respective user group. Accordingly, preferred embodiments of the invention determine the minimum throughput requirements upon receipt of the assigned QoS level. In alternative embodiments, the new user group may be assigned a specific minimum throughput requirement without specifying a QoS level.

A storage device coupled to the network (e.g., a system administrator's computer system) preferably stores the Internet protocol address ("IP address") of each node 104A–104E in an IP address relational database that associates each node's IP address with one user group. The members of each user group thus may be determined by accessing the storage device.

In alternative embodiments of the invention, user groups may be formed based upon a user's identity only and not based upon the physical node utilized by the user to access the LAN 100. To that end, a user's IP address can be dynamically assigned (during or after login) in a conventional manner, such as by means of the well known Dynamic Host Configuration Protocol ("DHCP"). Once logged onto the LAN 100, a previously configured group database with both the user's login information and user group information can be accessed to determine such member's user group. The dynamically assigned IP address of the user and associated user group then can be stored in the above noted IP address relational database, thus identifying the user as a member of the user group specified in the group database. The IP address can be deleted from the IP address relational database when the user logs off the LAN 100.

In other embodiments, nodes and/or users may be assigned to more than one user group. Principles of preferred embodiments of the invention also may be applied to user groups configured in these and other alternative embodiments.

Data packets transmitted by a member of a user group typically include user group configuration data within their respective headers. Among such configuration data is an indication as to the minimum throughput requirement of such packets. This may be represented in a two bit field, for example, indicating four different throughput priority levels. Each of the four values that may be represented in the two bit field preferably is stored in a look up table to correspond with one of four minimum throughput requirements. Accordingly, the lookup table may be checked when this two bit field is read by a transmitting/forwarding node in the LAN 100 to determine the minimum throughput of a packet to be transmitted.

Figure 2:
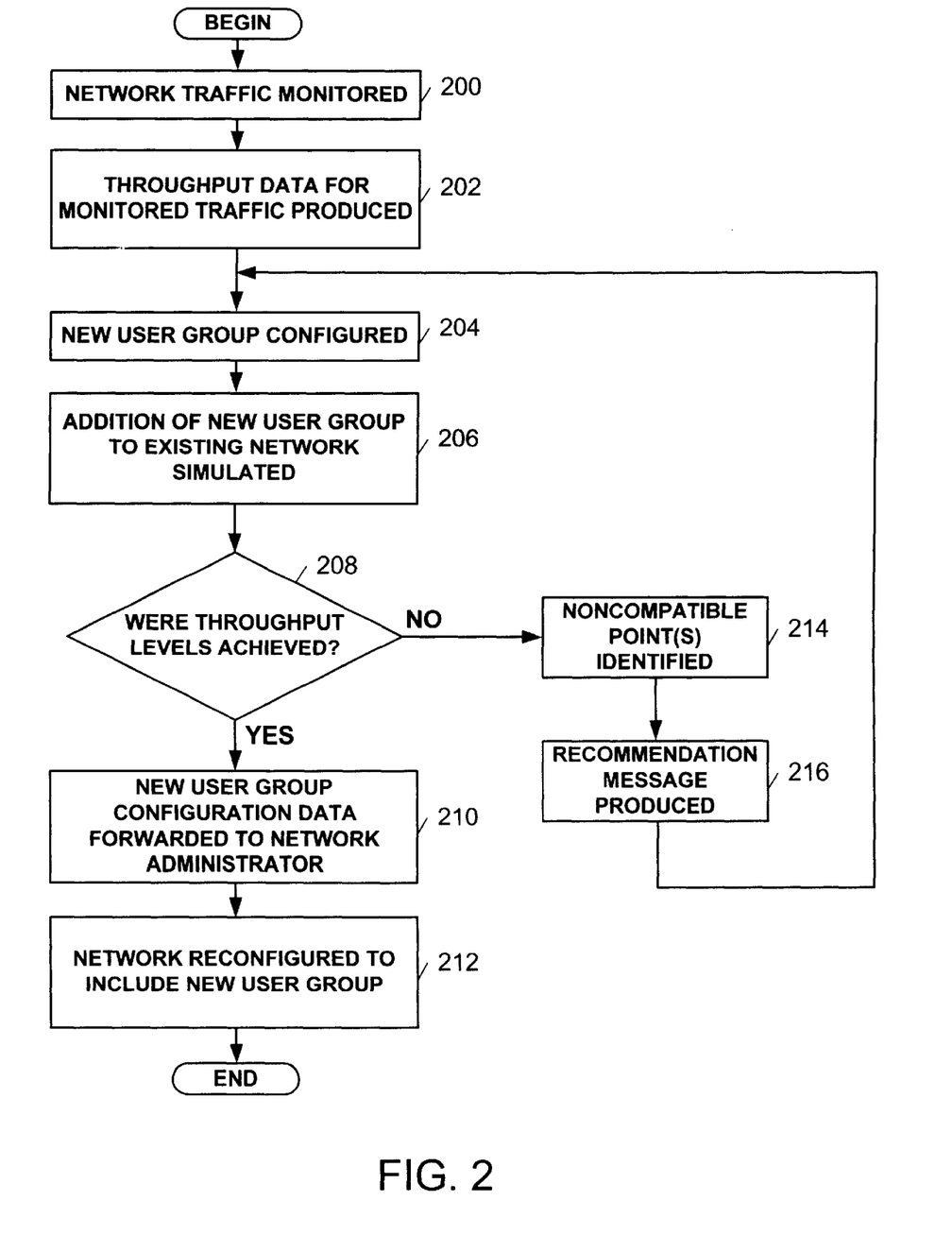
FIG. 2 shows a preferred process for analyzing the effect of adding a user group to the network shown in FIG. 1.

FIG. 2 shows a preferred process for analyzing the effect of adding a user group to the LAN 100. In preferred embodiments, this process is implemented as a computer program product (discussed below) executing on a system administrator's computer system. Such computer system may be one of the nodes on the LAN 100. The process begins at step 200 in which data traffic on the LAN 100 is monitored over a selected time interval. Such time interval may be any time interval as selected by the system administrator. For example, the time interval may be several seconds, minutes, days, weeks, months, years, etc . . . If the LAN 100 utilizes the Ethernet protocol, network traffic may be monitored on any node in the LAN 100. As noted above, however, LAN traffic preferably is monitored on the system administrator's computer in accord with conventional LAN traffic monitoring techniques. One such monitoring technique that may be utilized is that executed in accord with the well known BANDWIDTH BROKER standard, developed by the Differentiated Services working group of the Internet Engineering Task Force ("IETF∞").

Figure 3A:
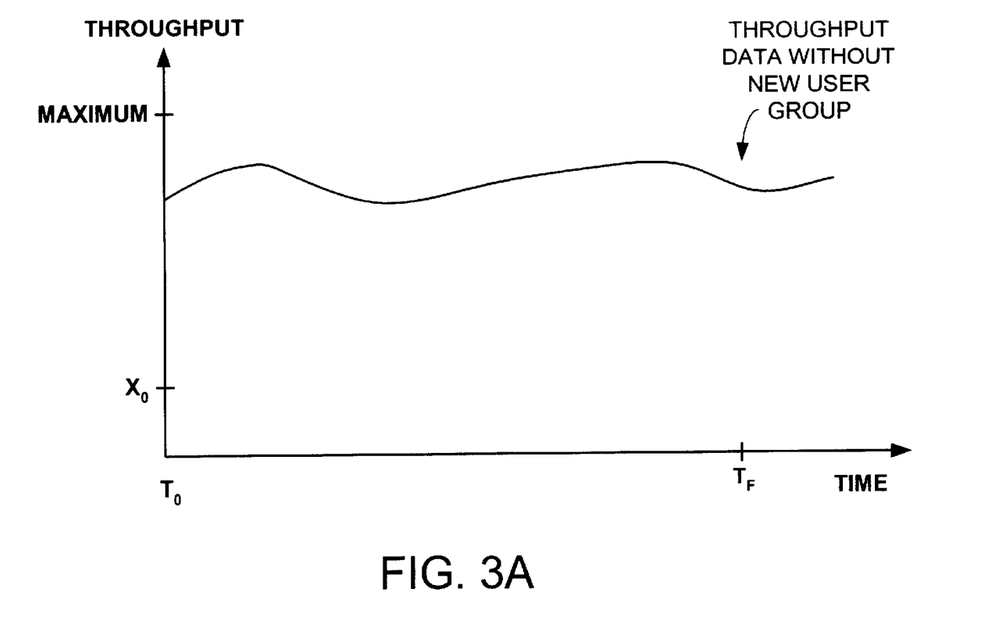
FIG. 3A shows an exemplary graphical display of monitored throughput data across the network shown in FIG. 1.

Data collected from monitoring the LAN 100 ("throughput data") may be stored in a relational database on the system administrator's computer (step 202). This throughput data may be stored so that it can be subsequently displayed graphically as a function of time. FIG. 3A shows an exemplary graphical display of the monitored throughput data across the LAN 100 for a specified time interval spanning between an initial time ("To") to a final time ("Tf"). It should be noted that the "THROUGHPUT" axis of the graph specifically marks a "MAXIMUM" value and an "Xo" value. The MAXIMUM value indicates the maximum total data throughput that the LAN 100 is capable of efficiently processing. Data packets thus may be dropped if the total throughput across the LAN 100 rises above this maximum value. The Xo value marks the minimum throughput required by the new user group. Accordingly, in preferred embodiments, the Xo value is specified by the QoS level assigned to the new user group.

After the monitored data is stored, the process continues to step 204 in which a new user group is configured by the system administrator. This new user group may include any of the other nodes on the LAN 100 that are not in existing user groups. For example, nodes one and two (104A and 104B) may be in an existing user group, while nodes three, four, and five (104C–104E) may not be in an existing user group. In alternative embodiments, new nodes (not shown) are added to the LAN 100 to form the new user group. In still other embodiments, nodes are moved from existing user groups to the new user group.

Figure 5:
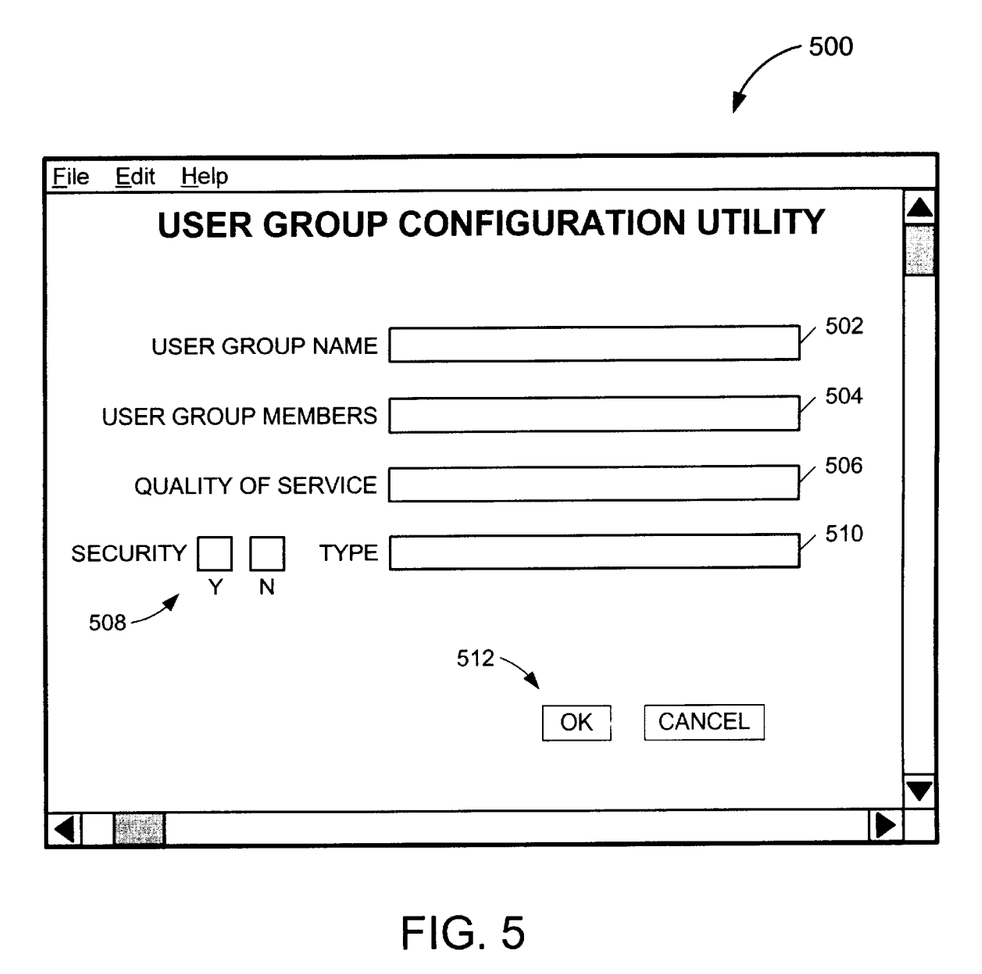
FIG. 5 shows an exemplary graphical user interface that may be utilized to configure the new user group described by the process shown in FIG. 2.

A graphical user interface 500 (see FIG. 5) may be utilized in step 204 to configure the new user group. As shown in FIG. 5, the interface 500 includes several fields for entering data. Those fields may include, among other fields, a "USER GROUP NAME" field 502 for specifying the name of the user group, a "USER GROUP MEMBERS" field 504 for specifying the nodes to be members of the new user group, and a "QUALITY OF SERVICE" field 506 for specifying a QoS level for the new user group. The user interface 500 also may include a SECURITY" field 508, specifying whether or not a data security method is to be utilized. If a "YES" field is selected, then a "TYPE" field 510 is enabled to select a specified security method (e.g., the above noted Rivest, Shamir, and Adleman cryptography method). Selection of an "OK" button 512 on the user interface 500 stores the entered data in a temporary configuration data file on the system administrator's computer system.

After the user group is configured, the process continues to step 206 in which addition of the new user group to the existing network is simulated over the specified time interval (e.g., To to Tf). Specifically, the monitored throughput data (from steps 200 and 202) is combined with the configuration data of the new user group (i.e., the minimum throughput requirements in the above noted temporary configuration data file) to produce simulated flow data over the selected time interval. This simulated flow data approximates data flow through the LAN 100, over the selected time interval, as if the new user group was implemented in the LAN 100 during that time interval.

Figure 3B:
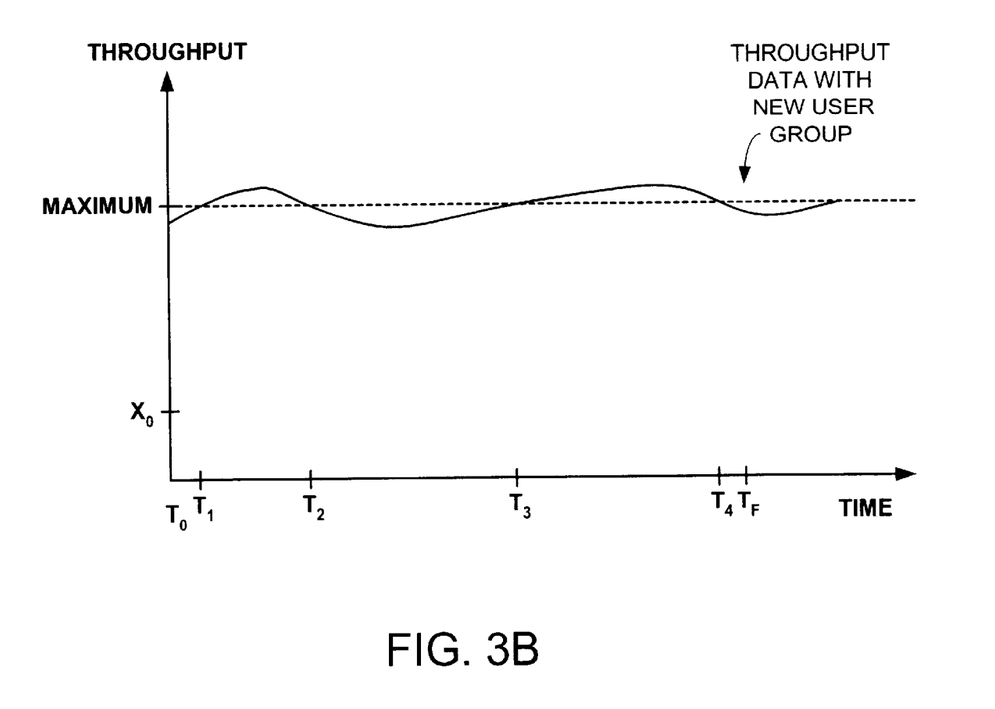
FIG. 3B graphically shows an exemplary method of simulating data flow through the network, shown in FIG. 1, based upon the monitored throughput data of FIG. 3A and a newly configured user group.

FIG. 3B graphically shows an exemplary simulation method of simulating data flow through the LAN 100, over the specified time interval, with the addition of the new user group. In particular, such simulation method shifts the throughput data curve upwardly by an amount of Xo to represent the combined throughput data (i.e., throughput flow through the LAN 100 with the new user group). This method assumes that the minimum required bandwidth of the new user group is reserved at all times for use by the new user group. In alternative embodiments, more complex simulation methods may be utilized that simulate varying throughput from the new user group. Such methods are unnecessary, however, since even those methods are subject to significant errors that can occur due to unforeseen data flow fluctuations from the new user group when it actually is coupled to the LAN 100.

It then is determined at step 208 if the minimum throughput of the new user group is compatible with the maximum throughput of the existing LAN 100. Specifically, it is determined if the combined throughput data curve undesirably exceeds the maximum throughput value for the entire LAN 100 at any time during the specified time interval. As noted above, attempts to drive throughput above the maximum throughput value can cause the LAN 100 to lose data packets. This may be determined by inspecting the graph in FIG. 3B. As shown, the combined throughput data for the exemplary data in this figure is below the maximum LAN throughput value for the time intervals To–T1, T2–T3, and T4–Tf. Conversely, the combined throughput data for this example is above the maximum LAN throughput value for the time intervals T1–T2, and T3–T4.

If it is determined at step 208 that addition of the new user group is compatible with the existing LAN 100 (i.e., not the case with FIGS. 3A and 3B), then the process continues to step 210 in which the new user group configuration data is forwarded to the system administrator in the form of a message. In addition to having the configuration data, the message also may include information indicating that the new user group may be added to the LAN 100 without limitation. The network then may be reconfigured to include the new user group (step 212), thus completing the process.

Figure 4A:
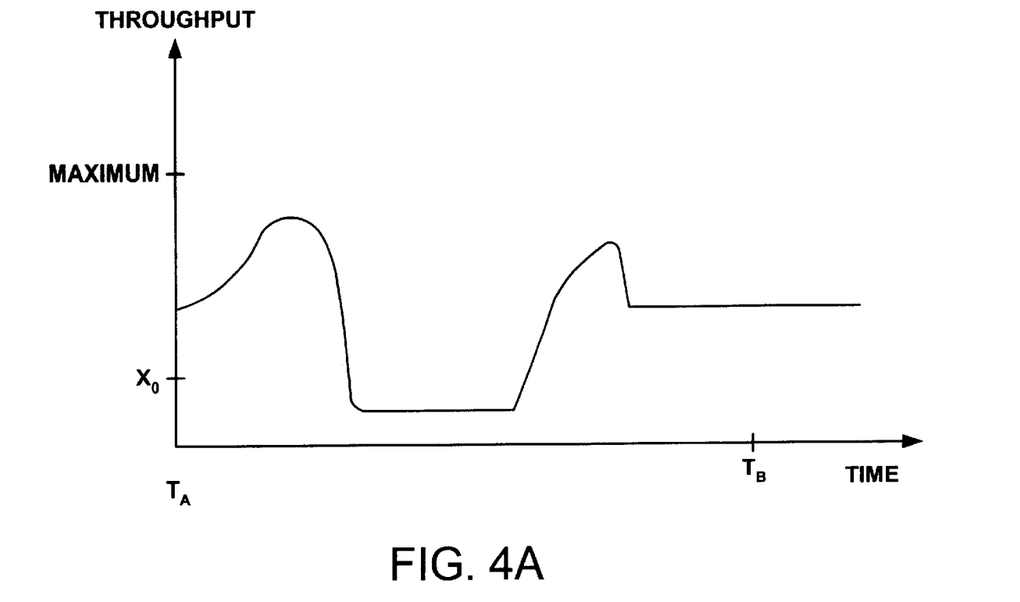
FIG. 4A shows another exemplary graphical display of monitored throughput data across the network shown in FIG. 1.
Figure 4B:
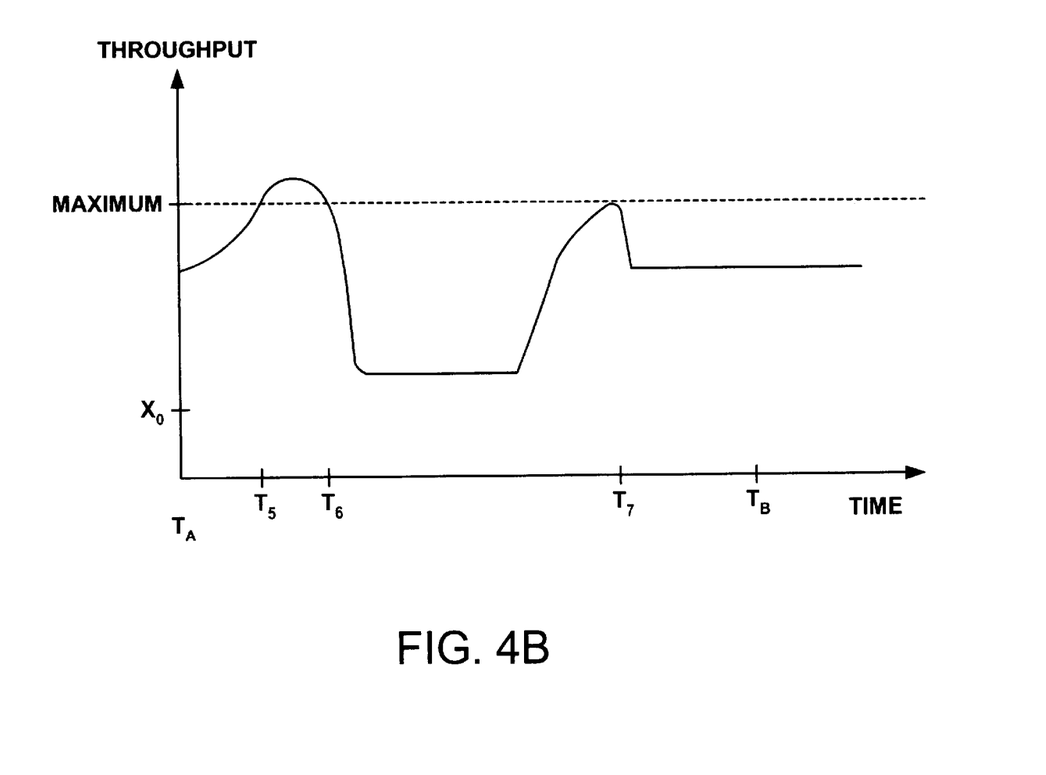
FIG. 4B graphically shows an exemplary method of simulating data flow through the network, shown in FIG. 1, based upon the monitored throughput data of FIG. 4A and a newly configured user group.

Returning to step 208, if it is determined that the addition of the new user group is not compatible with the existing LAN 100, then the process continues to step 214 in which noncompatible time intervals are identified. Continuing with the example of FIG. 3B, the noncompatible time intervals (as noted above) are T1–T2, and T3–T4. As an additional example, FIGS. 4A and 4B show other exemplary throughput data and combined throughput data curves, respectively, produced for the LAN 100 between a time interval Ta–Tb. As can be deduced by inspection from FIG. 4B, the noncompatible time intervals are between T5 and T6, and perhaps at an exact time, T7.

Once the noncompatible time intervals are identified, then a recommendation message is produced and displayed on the system administrator's computer display (step 216). The recommendation message includes recommendations relating to adding the new user group. More particularly, the recommendation message preferably includes one of the following recommendations:

1) The new user group in its simulated configuration must not be added under any circumstances; or
2) The new user group in its simulated configuration may be added, but subject to certain limitations;

The first listed recommendation may be made when the entire combined throughput curve is above the maximum throughput capacity of the LAN 100 for the entire time interval. Addition of the new user group therefore should cause the LAN 100 to operate above the maximum LAN throughput capacity, thus causing data packet loss. Accordingly, the new user group should not be added to the LAN 100 with its simulated configuration.

Upon receipt of this recommendation message, the system administrator may alter the existing network, and/or modify the desired network characteristics of the new user group. For example, the QoS of either or both the existing user groups and the new user group may be adjusted to a lower level to require a lower minimum throughput value. The process of FIG. 2 then can be repeated to produce a new recommendation. If only the new user group was adjusted, then the process may be repeated without monitoring the LAN 100. If the existing user groups were adjusted, however, then the entire process should be repeated. In some embodiments, the recommendation message also suggests that additional or new hardware should be added to the LAN 100 to permit addition of the new user group. Such additional hardware may enlarge the maximum throughput value of the LAN 100, thus permitting the new user group to be added. In some embodiments, a specific type and model of the additional hardware is suggested.

The second listed recommendation may be made when some portions of the combined throughput curve are above the maximum throughput capacity value, and when other portions of the combined throughput curve are below the maximum throughput capacity value. The exemplary simulations shown in FIGS. 3B and 4B would produce this recommendation. Consequently, the recommendation message also may include data specifying that the new user group may be added if it is not utilized during time intervals that the combined throughput curve is above the maximum throughput limit of the LAN 100 (i.e., nonconforming time intervals). For example, if the LAN 100 is monitored over a twenty-four hour time interval, then specific times of the day may be specified.

The recommendation may include additional data, such as a recommendation that during selected time intervals, the combined throughput curve is very close to the maximum value and that relatively slight fluctuations in data traffic can cause throughput to exceed the maximum (e.g., FIG. 3A). The amount of throughput considered to be "slight" fluctuations can be preprogrammed values stored in the system administrator's computer. Accordingly, even though below the maximum, the system administrator may decide to not add the new user group (in its simulated configuration) to the LAN 100 in its existing configuration. Other additional recommendation data also may include a recommendation to add new or additional hardware to the LAN 100 to increase the LAN maximum throughput capacity. Upon receipt of the second listed recommendation, the system administrator may re-execute the process of FIG. 2 with new configuration values for the user group and/or the existing user groups, add new hardware, or add the new user group subject to the specified time limitations. The process therefore preferably loops back to step 204 in which a new user group with the recommended configuration values are utilized.

There are instances when the second listed recommendation may be made when no part of the combined throughput curve exceeds the maximum throughput value. More particularly, this recommendation may be made in such circumstance when the combined throughput curve is very close to, but not exceeding the maximum value. As noted above, slight fluctuations in traffic from the new user group or the LAN 100 can cause the combined throughput to exceed the maximum throughput value when the combined throughput curve is relatively close to the maximum value.

In some embodiments of the invention, some of the steps of the system administrator may be automated. For example, upon receipt of either of the first and second recommendations, the process of FIG. 2 can be re-executed with a new user group having a lower minimum throughput requirement. This can be an iterative process that continues until a recommendation message is produced indicating that the new user group, with its then current QoS level, is compatible with the maximum throughput value. This iterative process can be repeated indefinitely, or a preselected number of times as configured by the system administrator. Upon receipt of the recommendation message, an autoconfiguration tool may be utilized to reconfigure the network to add the new user group.

It should be noted that like most simulations, the simulation of step 206 (and exemplified in FIGS. 3B and 4B) is subject to a margin of error that can deviate from the future actual performance of the LAN 100 with the new user group. More particularly, actual data traffic monitored in step 202 can fluctuate from time interval to time interval. For example, data traffic monitored on a weekday can vary substantially from data traffic monitored on a weekend day or a holiday. Data monitored during a weekday thus may not be applicable to weekend LAN use. Accordingly, the simulated results of step 206 are approximations of potential future data traffic flows and should not be considered to be an absolutely accurate depiction of future data traffic across the LAN 100. This should be taken into consideration by the system administrator when determining the most efficient way (if any) to modify the LAN 100.

Use of the process shown in FIG. 2 thus saves time and expense by enabling the system administrator to analyze the effect of adding a new user group to the LAN 100 without actually reconfiguring the LAN 100 and adding the new user group. In addition, a hardware and/or software vendor may provide this analysis service to a customer to recommend changes to an existing LAN 100 that expects to add new user groups. Additional beneficial uses of the process should be apparent to those skilled in the art. For example, existing user groups on the LAN 100 may be reconfigured to effectively produce new user groups. In such case, the process can be applied to the newly configured user group as if it were an entirely new user group.

It should be noted that although preferred embodiments of the invention have been discussed herein with reference to a LAN, other types of groups of network devices may be utilized. For example, a group of intermediate network devices having no associated user may be utilized with preferred embodiments. As a further example, a virtual private network also may be utilized with preferred embodiments. Various types of extranets and intranets also may be utilized. In the specification and claims that follow, the term "user group" therefore is intended to be interpreted to comprise any type of group (e.g., a logical or physical grouping) of network devices. Such term shall not be considered to be limited to any specific embodiment discussed herein (e.g., a LAN with user controlled nodes).

As an additional matter, preferred embodiments of the invention may be utilized to control other network characteristics of a user group. Another such network characteristic, for example, is the data latency rate for data transmitted to or from such user group. Other network characteristics known in the art also may be utilized.

Preferred embodiments of the invention may be implemented in any conventional computer programming language. For example, preferred embodiments may be implemented in a procedural programming language (e.g., "C"), an object oriented programming language (e.g., "C++" or JAVA), or a functional language (e.g., PROLOG). Alternative embodiments of the invention may be implemented as preprogrammed hardware elements, or other related components.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet 106 or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

I claim:

1. A method of analyzing the effect of adding a user group to a network having a maximum network characteristic, the user group requiring a minimum of the network characteristic across the network, the minimum of the network characteristic of the user group being defined by group minimum network characteristic data, the method comprising monitoring data flow in the network over a selected time interval to produce network characteristic flow data;

combining the group minimum network characteristic data with the network characteristic flow data to produce combined network characteristic data;

producing a reconfiguration message if the combined network characteristic data is not compatible with the maximum network characteristic of the network, the reconfiguration message providing information relating to reconfiguring the network to facilitate the addition of the user group to the network; and wherein the reconfiguration message includes information indicating that the group minimum network characteristic data can be maintained if the user group is operated on the network at no times other than during one or more specified time intervals.

2. The method as defined by claim 1 wherein the user group includes at least one node.

3. The method as defined by claim 1 further comprising: producing an approval message if the combined network characteristic data is compatible with the maximum network characteristic of the network, the approval message indicating that the user group may be added to the network and maintain at least the user group minimum network characteristic requirement.

4. The method as defined by claim 3 wherein the network includes at least one existing user group, each existing user group having an existing user group network characteristic minimum, the approval message indicating that the user group may be added to the network without affecting the existing user group network characteristic minimum of any of the existing user groups.

5. The method as defined by claim 1 wherein the network is a local area network.

6. The method as defined by claim 1 further comprising: determining if the combined network characteristic data is compatible with the maximum network characteristic of the network.

7. The method as defined by claim 6 wherein the combined network characteristic data is deemed to be compatible with the maximum network characteristic if the value of the combined network characteristic data does not exceed the value of the maximum network characteristic at any time during the selected time interval.

8. The method as defined by claim 1 wherein the network characteristic flow data is represented as a function of the selected time interval.

9. The method as defined by claim 1 wherein the reconfiguration message includes information indicating that the network characteristic flow data must be reduced to enable the user group to be added and maintain its required minimum network characteristic across the network.

10. The method as defined by claim 9 wherein the network includes one or more existing groups, each of the one or more existing groups having an existing group minimum network characteristic requirement, the reconfiguration message including information indicating that the existing group minimum network characteristic requirements of one of the existing groups must be reduced to enable the user group to be added and maintain the required user group minimum network characteristic across the network.

11. The method as defined by claim 1 wherein the user group is to operate at a specified quality of service level having a minimum network characteristic requirement, the minimum network characteristic of the group being the same as the minimum network characteristic requirement of the specified quality of service level.

12. The method as defined by claim 1 further comprising: displaying a user interface for entering configuration data for the user group into a computer system, the configuration data including data specifying a quality of service level.

13. The method as defined by claim 1 further comprising: reconfiguring the network to comply with the reconfiguration message.

14. The method as defined by claim 1 wherein the network characteristic is throughput.

15. The method as defined by claim 1 wherein the network characteristic is latency.

16. An apparatus for analyzing the effect of adding a user group to a network having a maximum network characteristic, the user group requiring a minimum of the network characteristic across the network, the minimum of the network characteristic of the user group being defined by group minimum network characteristic data, the apparatus comprising a flow monitor that monitors data flow in the network over a selected time interval to produce network characteristic flow data;

a combiner that combines the group minimum network characteristic data with the network characteristic flow data to produce combined network characteristic data;

a message producer that produces a reconfiguration message if the combined network characteristic data is not compatible with the maximum network characteristic of the network, the reconfiguration message providing information relating to reconfiguring the network to facilitate the addition of the user group to the network; and wherein the reconfiguration message includes information indicating that the network characteristic flow data must be reduced to enable the user group to be added and maintain its required minimum network characteristic across the network.

17. The apparatus as defined by claim 16 wherein the user group includes at least one node.

18. The apparatus as defined by claim 16 further comprising:

an approval message producer that produces an approval message if the combined network characteristic data is compatible with the maximum network characteristic of the network, the approval message indicating that the user group may be added to the network and maintain at least the user group minimum network characteristic requirement.

19. The apparatus as defined by claim 18 wherein the network includes at least one existing user group, each existing user group having an existing user group network characteristic minimum, the approval message indicating that the user group may be added to the network without affecting the existing user group network characteristic minimum of any of the existing user groups.

20. The apparatus as defined by claim 16 wherein the network is a local area network.

21. The apparatus as defined by claim 16 further comprising:

a determiner that determines if the combined network characteristic data is compatible with the maximum network characteristic of the network.

22. The apparatus as defined by claim 21 wherein the combined network characteristic data is deemed to be compatible with the maximum network characteristic if the value of the combined network characteristic data does not exceed the value of the maximum network characteristic at any time during the selected time interval.

23. The apparatus as defined by claim 16 wherein the network characteristic flow data is represented as a function of the selected time interval.

24. The apparatus as defined by claim 16 wherein the reconfiguration message includes information indicating that the group minimum network characteristic data can be maintained if the user group is operated on the network at no times other than during one or more specified time intervals.

25. The apparatus as defined by claim 16 wherein the network includes one or more existing groups, each of the one or more existing groups having an existing group minimum network characteristic requirement, the reconfiguration message including information indicating that the existing group minimum network characteristic requirements of one of the existing groups must be reduced to enable the user group to be added and maintain the required user group minimum network characteristic across the network.

26. The apparatus as defined by claim 16 wherein the user group is to operate at a specified quality of service level having a minimum network characteristic requirement, the minimum network characteristic of the group being the same as the minimum network characteristic requirement of the specified quality of service level.

27. The apparatus as defined by claim 16 further comprising:
a display device that displays a user interface for entering configuration data for the user group into a computer system, the configuration data including data specifying a quality of service level.

28. The apparatus as defined by claim 16 further comprising:
a reconfiguration manager that reconfigures the network to comply with the reconfiguration message.

29. The apparatus as defined by claim 16 wherein the network characteristic is throughput.

30. The apparatus as defined by claim 16 wherein the network characteristic is latency.

31. A computer program product for use on a computer system for analyzing the effect of adding a user group to a network having a maximum network characteristic, the user group requiring a minimum of the network characteristic across the network, the minimum of the network characteristic of the user group being defined by group minimum network characteristic data, the computer program product comprising a computer usable medium having computer readable program code thereon, the computer readable program code including:
program code for monitoring data flow in the network over a selected time interval to produce network characteristic flow data;
program code for combining the group minimum network characteristic data with the network characteristic flow data to produce combined network characteristic data;
program code for producing a reconfiguration message if the combined network characteristic data is not compatible with the maximum network characteristic of the network, the reconfiguration message providing information relating to reconfiguring the network to facilitate the addition of the user group to the network;
program code for reconfiguring the network to comply with the reconfiguration message;
program code for producing an approval message if the combined network characteristic data is compatible with the maximum network characteristic of the network, the approval message indicating that the user group may be added to the network and maintain at least the user group minimum network characteristic requirement; and
wherein the network includes at least one existing user group, each existing user group having an existing user group network characteristic minimum, the approval message indicating that the user group may be added to the network without affecting the existing user group network characteristic minimum of any of the existing user groups.

32. The computer program product as defined by claim 31 wherein the user group includes at least one node.

33. The computer program product as defined by claim 31 wherein the network is a local area network.

34. A computer program product for use on a computer system for analyzing the effect of adding a user group to a network having a maximum network characteristic, the user group requiring a minimum of the network characteristic across the network, the minimum of the network characteristic of the user group being defined by group minimum network characteristic data, the computer program product comprising a computer usable medium having computer readable program code thereon, the computer readable program code including:
program code for monitoring data flow in the network over a selected time interval to produce network characteristic flow data;
program code for combining the group minimum network characteristic data with the network characteristic flow data to produce combined network characteristic data;
program code for producing a reconfiguration message if the combined network characteristic data is not compatible with the maximum network characteristic of the network, the reconfiguration message providing information relating to reconfiguring the network to facilitate the addition of the user group to the network;
program code for determining if the combined network characteristic data is compatible with the maximum network characteristic of the network; and
wherein the combined network characteristic data is deemed to be compatible with the maximum network characteristic if the value of the combined network characteristic data does not exceed the value of the maximum network characteristic at any time during the selected time interval.

35. The computer program product as defined by claim 31 wherein the network characteristic flow data is represented as a function of the selected time interval.

36. A computer program product for use on a computer system for analyzing the effect of adding a user group to a network having a maximum network characteristic, the user group requiring a minimum of the network characteristic across the network, the minimum of the network characteristic of the user group being defined by group minimum network characteristic data, the computer program product comprising a computer usable medium having computer readable program code thereon, the computer readable program code including:
program code for monitoring data flow in the network over a selected time interval to produce network characteristic flow data;
program code for combining the group minimum network characteristic data with the network characteristic flow data to produce combined network characteristic data;
program code for producing a reconfiguration message if the combined network characteristic data is not compatible with the maximum network characteristic of the network, the reconfiguration message providing information relating to reconfiguring the network to facilitate the addition of the user group to the network; and
wherein the reconfiguration message includes information indicating that the group minimum network characteristic data can be maintained if the user group is operated on the network at no times other than during one or more specified time intervals.

37. A computer program product for use on a computer system for analyzing the effect of adding a user group to a network having a maximum network characteristic, the user group requiring a minimum of the network characteristic across the network, the minimum of the network characteristic of the user group being defined by group minimum network characteristic data, the computer program product comprising a computer usable medium having computer readable program code thereon, the computer readable program code including:

program code for monitoring data flow in the network over a selected time interval to produce network characteristic flow data;

program code for combining the group minimum network characteristic data with the network characteristic flow data to produce combined network characteristic data;

program code for producing a reconfiguration message if the combined network characteristic data is not compatible with the maximum network characteristic of the network, the reconfiguration message providing information relating to reconfiguring the network to facilitate the addition of the user group to the network; and wherein the reconfiguration message includes information indicating that the network characteristic flow data must be reduced to enable the user group to be added and maintain its required minimum network characteristic across the network.

38. A computer program product for use on a computer system for analyzing the effect of adding a user group to a network having a maximum network characteristic, the user group requiring a minimum of the network characteristic across the network, the minimum of the network characteristic of the user group being defined by group minimum network characteristic data, the computer program product comprising a computer usable medium having computer readable program code thereon, the computer readable program code including:

program code for monitoring data flow in the network over a selected time interval to produce network characteristic flow data;

program code for combining the group minimum network characteristic data with the network characteristic flow data to produce combined network characteristic data;

program code for producing a reconfiguration message if the combined network characteristic data is not compatible with the maximum network characteristic of the network, the reconfiguration message providing information relating to reconfiguring the network to facilitate the addition of the user group to the network; and wherein the network includes one or more existing groups, each of the one or more existing groups having an existing group minimum network characteristic requirement, the reconfiguration message including information indicating that the existing group minimum network characteristic requirements of one of the existing groups must be reduced to enable the user group to be added and maintain the required user group minimum network characteristic across the network.

39. A computer program product for use on a computer system for analyzing the effect of adding a user group to a network having a maximum network characteristic, the user group requiring a minimum of the network characteristic across the network, the minimum of the network characteristic of the user group being defined by group minimum network characteristic data, the computer program product comprising a computer usable medium having computer readable program code thereon, the computer readable program code including:

program code for monitoring data flow in the network over a selected time interval to produce network characteristic flow data;

program code for combining the group minimum network characteristic data with the network characteristic flow data to produce combined network characteristic data;

program code for producing a reconfiguration message if the combined network characteristic data is not compatible with the maximum network characteristic of the network, the reconfiguration message providing information relating to reconfiguring the network to facilitate the addition of the user group to the network; and wherein the user group is to operate at a specified quality of service level having a minimum network characteristic requirement, the minimum network characteristic of the group being the same as the minimum network characteristic requirement of the specified quality of service level.

40. The computer program product as defined by claim 31 further comprising:

program code for causing a display device to display a user interface for entering configuration data for the user group into.a computer system, the configuration data including data specifying a quality of service level.

41. The computer program product as defined by claim 31 wherein the network characteristic is throughput.

42. The computer program product as defined by claim 31 wherein the network characteristic is latency.

* * * * *